United States Patent
Guardado

(10) Patent No.: US 6,293,696 B1
(45) Date of Patent: Sep. 25, 2001

(54) SYSTEM AND PROCESS FOR CALIBRATING PYROMETERS IN THERMAL PROCESSING CHAMBERS

(75) Inventor: Julio L. Guardado, Milpitas, CA (US)

(73) Assignee: Steag RTP Systems, Inc., San Jose, CA (US)

(*) Notice: Subject to any disclaimer, the term of this patent is extended or adjusted under 35 U.S.C. 154(b) by 0 days.

(21) Appl. No.: 09/303,733

(22) Filed: May 3, 1999

(51) Int. Cl.⁷ ............................. G01K 15/00; G01J 5/08
(52) U.S. Cl. .................. 374/2; 374/1; 374/120; 374/121; 374/126; 374/127; 374/129; 374/130; 374/131; 374/141; 250/252.1; 356/43; 219/405; 219/411; 392/416
(58) Field of Search .................... 374/1, 2, 141, 374/120, 121, 126, 127, 129, 130, 131; 250/252.1; 219/405, 409, 411; 392/411, 416, 418, 422, 423; 356/43, 46

(56) References Cited

U.S. PATENT DOCUMENTS

| | | |
|---|---|---|
| 3,537,314 | 11/1970 | Svet. |
| 3,630,085 | 12/1971 | Roney et al. |
| 3,765,779 * | 10/1973 | Hunt et al. ............... 374/2 |
| 4,465,382 | 8/1984 | Iuchi et al. |
| 4,511,800 | 4/1985 | Harbeke et al. |
| 4,649,261 | 3/1987 | Sheets. |
| 4,919,542 | 4/1990 | Nulman et al. |
| 4,956,538 | 9/1990 | Moslehi. |
| 4,969,748 | 11/1990 | Crowley et al. |
| 4,984,902 | 1/1991 | Crowley et al. |
| 5,029,117 | 7/1991 | Patton. |
| 5,114,242 | 5/1992 | Gat et al. |
| 5,154,512 | 10/1992 | Schietinger et al. |
| 5,165,796 | 11/1992 | Gat et al. |
| 5,188,458 | 2/1993 | Thompson et al. |
| 5,226,732 | 7/1993 | Nakos et al. |
| 5,249,142 | 9/1993 | Shirakawa et al. |
| 5,255,286 | 10/1993 | Moslehi et al. |
| 5,265,957 * | 11/1993 | Moslehi et al. ............ 374/1 |
| 5,271,084 | 12/1993 | Vandenabeele et al. |
| 5,305,416 | 4/1994 | Fiory. |
| 5,308,161 | 5/1994 | Stein. |
| 5,326,173 | 7/1994 | Evans et al. |
| 5,442,727 | 8/1995 | Fiory. |
| 5,443,315 | 8/1995 | Lee et al. |
| 5,444,815 | 8/1995 | Lee et al. |
| 5,467,220 | 11/1995 | Xu. |
| 5,553,939 * | 9/1996 | Dilhac et al. ............. 374/2 |
| 5,624,590 | 4/1997 | Fiory. |
| 5,628,564 | 5/1997 | Nenyei et al. |
| 5,660,472 | 8/1997 | Peuse et al. |
| 5,727,017 | 3/1998 | Maurer et al. |
| 5,762,419 * | 6/1998 | Yam ........................ 374/2 |
| 5,830,277 * | 11/1998 | Johnsgard et al. ......... 374/126 |
| 5,938,335 * | 8/1999 | Yam ........................ 374/124 |
| 5,988,874 * | 11/1999 | Rohner ..................... 374/2 |
| 6,027,244 * | 2/2000 | Champetier et al. ........ 374/130 |
| 6,056,433 * | 5/2000 | Yam ........................ 374/2 |
| 6,056,434 * | 5/2000 | Champetier ................ 374/126 |

FOREIGN PATENT DOCUMENTS

0798547A2 10/1997 (EP).
0801292A2 10/1997 (EP).

* cited by examiner

Primary Examiner—Diego Gutierrez
Assistant Examiner—Stanley J. Pruchnic, Jr.
(74) Attorney, Agent, or Firm—Dority & Manning, P.A.

(57) ABSTRACT

A method and system for calibrating radiation sensing devices, such as pyrometers, in thermal processing chambers are disclosed. The system includes a reflective device positioned opposite the radiation sensing devices and a calibrating light source which emits light energy onto the reflective device. The system is designed so that each radiation sensing device is exposed to the same intensity of light being reflected off the reflective device, which has a preset value. The radiation sensing devices are then used to measure the amount of light energy being reflected which is then compared to the preset value for making any necessary adjustments.

19 Claims, 2 Drawing Sheets

SYSTEM AND PROCESS FOR CALIBRATING PYROMETERS IN THERMAL PROCESSING CHAMBERS

FIELD OF THE INVENTION

The present invention is generally directed to a system and method for calibrating temperature sensing devices in a thermal processing chamber. More particularly, the present invention is directed to a method and system for calibrating pyrometers in rapid thermal processing chambers for more accurately processing semiconductor wafers.

BACKGROUND OF THE INVENTION

A thermal processing chamber as used herein refers to a device that rapidly heats objects, such as semiconductor wafers. Such devices typically include a substrate holder for holding one or more semiconductor wafers and a light source that emits light energy for heating the wafers. During heat treatment, the semiconductor wafers are heated under controlled conditions according to a preset temperature regime. During heating, various processes can be carried out within the thermal processing chamber, such as rapid thermal oxidation, nitridation, annealing, silicidation, sintering and metallization.

Many semiconductor heating processes require a wafer to be heated to high temperatures so that the various chemical and physical transformations can take place as the wafer is fabricated into a device. During rapid thermal processing, for instance, semiconductor wafers are typically heated by an array of lights to temperatures from about 300° C. to about 1,200° C., for times which are typically less than a few minutes. During these processes, one main goal is to heat the wafers as uniformly as possible.

During the rapid thermal processing of a semiconductor wafer, it is desirable to monitor and control the wafer temperature. In particular, for all of the high temperature wafer processes of current and foreseeable interest, it is important that the true temperature of the wafer be determined with high accuracy, repeatability and speed. The ability to accurately measure the temperature of a wafer has a direct payoff in the quality and size of the manufactured integrated circuit. For instance, the smallest feature size required for a given semiconductor device limits the computing speed of the finished microchip. The feature size in turn is linked to the ability to measure and control the temperature of the device during processing.

One of the most significant challenges in wafer heating systems is the ability to accurately measure the temperature of substrates during the heating process. In the past, various means and devices for measuring the temperature of substrates in thermal processing chambers have been developed. Such devices include, for instance, pyrometers, thermocouples that directly contact the substrate or that are placed adjacent to the substrate, and the use of laser interference.

Currently, of the above temperature sensing devices, pyrometers are generally preferred for use in thermal processing chambers. Pyrometers are capable of measuring the temperature of a substrate, such as a semiconductor wafer, without contacting the substrate. For example, one advantage of using a non-contact pyrometer is that the substrate can be spun slowly during the heating process which promotes uniform temperature distribution and promotes more uniform contact between any gases flowing through the chamber and the substrate. Besides being able to rotate the wafers, another advantage to using pyrometers is that, since no temperature gauges need to be attached to the substrate, the substrate can be processed much more quickly saving precious time during semiconductor fabrication.

In order to use pyrometers in a thermal processing chamber, the pyrometers generally need to be calibrated. Consequently, various calibration procedures currently exist in order to align the temperature readings of the pyrometers with some absolute and accurate temperature reference. The current state of the art and the most widely used method to calibrate temperature devices, such as pyrometers, in thermal processing chambers are to place in the chambers a semiconductor wafer having a thermocouple embedded in the wafer. The temperature measurements taken from the thermocouple are compared with the temperature readings received from the temperature measuring devices and any discrepancy is calibrated out.

Another method that has been used in the past to calibrate temperature sensing devices, such as pyrometers, contained within thermal processing chambers is to heat a substrate within the chamber that undergoes a chemical or physical transformation when heated to a particular temperature. By observing or measuring the chemical or physical transformation that occurs, the temperature to which the substrate was heated can be accurately determined which can then be used to calibrate other temperature sensing devices contained within the chamber. For example, in one embodiment, silicon oxidation can be carried out within the chamber by heating a silicon substrate. The amount or extent of oxidation that occurs when the substrate is heated indicates the temperature to which the substrate was exposed. Besides silicon oxidation, other calibration methods include ion implant activation, such as As+ implant or $BF_2$+ implant, and silicidation of refractory metals, such as titanium and cobalt.

Although the above methods are well suited to calibrating temperature measuring devices, such as pyrometers, the above methods require a substantial amount of time in order to calibrate the instruments. As such, a need currently exists for a method of calibrating pyrometers in thermal processing chambers very rapidly without creating a substantial amount of down time. In particular, a need exists for a method of calibrating pyrometers in thermal processing chambers without having to open the chamber, in order to maintain chamber integrity and purity. A need also exists for a simple method for calibrating pyrometers in thermal processing chambers that can be used routinely as a regular check to verify that the optical pyrometry system is properly functioning.

SUMMARY OF THE INVENTION

The present invention recognizes and addresses the foregoing disadvantages and others of prior art constructions and methods.

Accordingly, it is an object of the present invention to provide an improved system and process for measuring the temperature of semiconductor wafers in thermal processing chambers.

Another object of the present invention is to provide a process for calibrating temperature sensing devices contained within thermal processing chambers.

It is another object of the present invention to provide a system and process for calibrating radiation sensing devices, such as pyrometers contained within thermal processing chambers.

Still another object of the present invention is to provide a method and system for calibrating pyrometers in thermal processing chambers without having to significantly interfere with the operation of the thermal processing chamber.

These and other objects of the present invention are achieved by providing a method for calibrating a temperature sensing device in a thermal processing chamber. The method includes the steps of providing a thermal processing chamber containing at least one radiation sensing device for monitoring the temperature of a semiconductor wafer placed in the chamber. The radiation sensing device can be, for instance, a pyrometer or a plurality of pyrometers that are configured to sense thermal radiation at a predetermined wavelength.

The thermal processing chamber is in communication with a heating source, such as a plurality of light energy sources for heating semiconductor wafers contained in the chamber. In accordance with the present invention, the chamber further includes a calibrating light source. The calibrating light source emits light energy at the wavelength at which the radiation sensing device operates.

A reflective device is placed within the thermal processing chamber. The reflective device is positioned opposite the radiation sensing devices and in view of the calibrating light source.

According to the method of the present invention, the calibrating light source emits light energy onto the reflective device. The reflective device reflects an amount of the light energy that has a preset value. The preset value can be a qualitative or relative value, or a quantitative value. The radiation sensing device senses the light energy being reflected from the reflective device. The radiation sensing device is then calibrated by comparing the amount of light energy sensed in relation to the preset value.

Various different types of reflective devices can be used in the process of the present invention. In general, the reflective device should be capable of reflecting the light being emitted by the calibrating light source in a manner so that each pyrometer contained within the thermal processing chamber is exposed to the same intensity of light. Also, although not necessary, preferably the reflective device is highly reflective at the wavelength at which the radiation sensing devices operate, such as having a reflectivity of at least 0.9.

The reflective device can include, for instance, a substrate having a highly reflective surface. The substrate, for instance, can be made from quartz, silicon carbide, or stainless steel. The highly reflective surface, on the other hand, can be a dielectric coating designed to have a high reflectivity or can be a highly reflective metal. In order to scatter and distribute the light being emitted by the calibrating light source over the surface of the reflective device, the surface of the reflective device can be rough or can be otherwise shaped in order to distribute the light energy.

In one embodiment, the calibrating light source can be configured to emit light energy directly into the reflective device. The reflective device can be configured to disperse the light energy throughout its interior prior to the light energy exiting at a surface of the reflective device. For instance, in this embodiment, the reflective device can be a quartz plate having a rough or prismatic surface. The quartz plate can include a receiving surface which can comprise an opening or a smooth spot where light being emitted by the calibrating light source is directed into the device.

In one embodiment of the present invention, the reflective device can be designed to be loaded and unloaded into the thermal processing chamber when calibration is required. For instance, the reflective device can be in the shape of a semiconductor wafer which can be held on a substrate holder contained within the chamber designed to also hold semiconductor wafers.

These and other objects of the present invention are also achieved by providing a system for calibrating temperature sensing devices in thermal processing chambers. This system includes a chamber adapted to receive and process semiconductor wafers. A heat source is in communication with the chamber for heating the wafers. The chamber includes at least one radiation sensing device for monitoring the temperature of semiconductor wafers contained within the chamber.

In accordance with the present invention, a reflective device is also positioned within the chamber opposite the radiation sensing devices. A calibrating light source is included for emitting light energy towards the reflective device. As described above, the reflective device is configured to reflect the light energy. The reflective light energy has a preset value and is configured to be sensed by the radiation sensing devices. The system further includes a controller in communication with the radiation sensing devices. The controller is configured to receive information from the radiation sensing devices when sensing the light energy being reflected from the reflective device. The controller is configured to calibrate the radiation sensing devices based on the amount of reflected light energy sensed by the radiation sensing devices in relation to the preset value. The controller can be, for instance, a programmable device, such as a microprocessor.

Other objects, features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
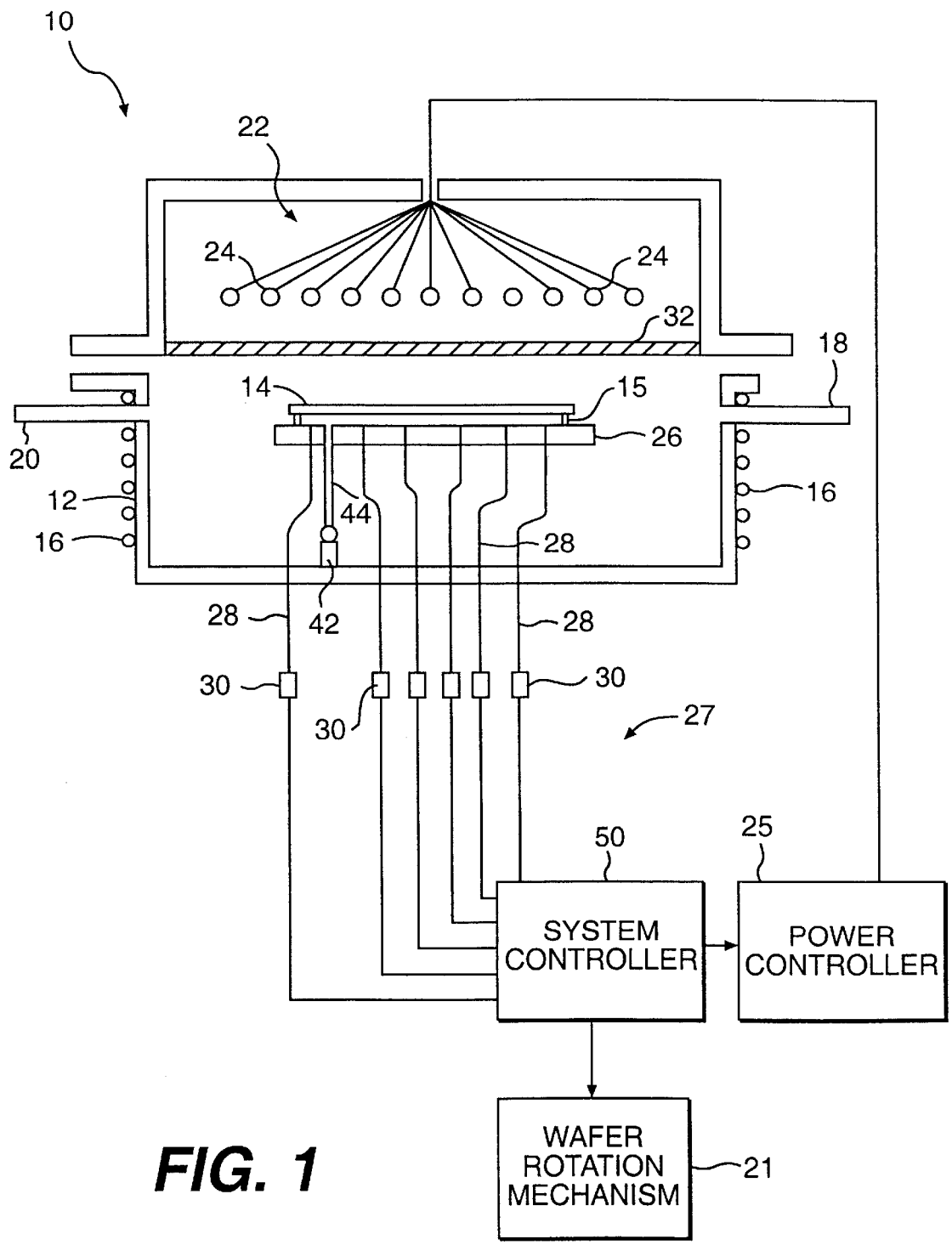
FIG. 1 is a side view of one embodiment of a system for calibrating temperature sensing devices in accordance with the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is directed to a method and to a system for more accurately determining and controlling the temperature of an object, particularly a semiconductor wafer in a thermal processing chamber during heat treatment. More particularly, the present invention is directed to a method and system for calibrating temperature measuring devices contained within thermal processing chambers so that the thermal processing chamber will operate more precisely. For instance, it is important that temperature sensing devices contained within thermal processing chambers accurately measure the temperature of semiconductor wafers as they are being heated. In this regard, the temperature sensing devices should be calibrated to ensure that they are accurately monitoring the temperature of the wafer. The temperature sensing devices should be monitored not only routinely but should also be calibrated for each different type of process that is carried out in the chamber. For example, such processes include annealing, oxidation, and other processes which modify or add films to the surface of wafers.

In general, the method of the present invention for calibrating temperature sensing devices, particularly radiation sensing devices such as pyrometers, includes the step of placing in a thermal processing chamber a reflective device positioned opposite the radiation sensing devices. A calibrating light source is also placed in communication with the chamber. The calibrating light source is configured to emit light energy onto the reflective device. The reflective device, on the other hand, is designed to reflect the light energy in a manner so that each radiation sensing device is exposed to the same intensity of light. The amount of light reflected off the reflecting device is known either qualitatively or quantitatively. The radiation sensing devices are then calibrated by comparing the reading obtained from the radiation sensing devices to the known value for the reflected light.

In one embodiment, a controller, such as a microprocessor, can be used to automate the system and automatically calibrate the radiation sensing devices. If necessary, a correction factor may be built in to compensate for any variability due to the physical placement of the reflecting surface, its physical characteristics, or the physical placement of the radiation sensing devices.

The method and system of the present invention offer various advantages and benefits. For instance, the present invention offers a relatively simple method for quickly calibrating the radiation sensing devices. The calibrations can be performed automatically between wafers or wafer lots by placing the reflective device into the thermal processing chamber when desired. For example, the reflecting device can be in the shape of a semiconductor wafer and can be placed within the chamber in the same location where semiconductor wafers are processed. Further, in this embodiment, the reflective device can be loaded and removed from the thermal processing chamber using the same mechanism that moves and transports the wafers.

The present invention allows for the calibration of radiation sensing devices in thermal processing chambers according to a relatively simple method that does not require substantial interference with the operation of the chamber. The present invention can be used to calibrate single or multi-point pyrometric systems. Further, the method and system of the present invention permit calibration without having to incorporate a thermocouple instrumented wafer as was done in the past.

Referring to FIG. 1, a system generally 10 made in accordance with the present invention for calibrating radiation sensing devices in thermal processing chambers in order to more accurately monitor the temperature of semiconductor wafers is illustrated. System 10 includes a processing chamber 12 adapted to receive substrates such as semiconductor wafers for conducting various processes. Chamber 12 is designed to heat the wafers at very rapid rates and under carefully controlled conditions. Chamber 12 can be made from various materials, including certain metals, glasses and ceramics. For instance, chamber 12 can be made from stainless steel or quartz.

When chamber 12 is made from a heat conductive material, preferably the chamber includes a cooling system. For instance, as shown in FIG. 1, chamber 12 includes a cooling conduit 16 wrapped around the perimeter of the chamber. Conduit 16 is adapted to circulate a cooling fluid, such as water, which is used to maintain the walls of chamber 12 at a constant temperature.

Chamber 12 can also include a gas inlet 18 and a gas outlet 20 for introducing a gas into the chamber and/or for maintaining the chamber within a preset pressure range. For instance, a gas can be introduced into chamber 12 through gas inlet 18 for reaction with the wafers. Once processed, the gas can then be evacuated from the chamber using gas outlet 20.

Alternatively, an inert gas can be fed to chamber 12 through gas inlet 18 for preventing any unwanted or undesirable side reactions from occurring within the chamber. In a further embodiment, gas inlet 18 and gas outlet 20 can be used to pressurize chamber 12. A vacuum can also be created in chamber 12 when desired, using gas outlet 20 or an additional larger outlet positioned beneath the level of the wafer.

During processing, chamber 12, in one embodiment, can include a substrate holder 15 designed to rotate wafers using a wafer rotation mechanism 21. Rotating the wafer promotes greater temperature uniformity over the surface of the wafer and promotes enhanced contact between the wafer and any gases introduced into the chamber. It should be understood, however, that besides wafers, chamber 12 is also adapted to process optical parts, films, fibers, ribbons, and other substrates having any particular shape.

A heat source generally 22 is included in communication with chamber 12 for heating the wafers during processing. In this embodiment, heat source 22 includes a plurality of lamps 24, such as tungsten-halogen lamps. Heat source 22 can include a reflector or set of reflectors, for carefully directing thermal energy being emitted by the heat source onto the wafers so as to produce a very uniform wafer temperature. As shown in FIG. 1, lamps 24 are placed above the chamber. It should be understood, however, that lamps 24 may be placed at any particular location. Further, additional lamps could be included within system 10 if desired.

The use of lamps 24 as heat source 22 is generally preferred. For instance, lamps have much higher heating and cooling rates than other heating devices, such as electrical elements or conventional furnaces. Lamps 24 create a rapid isothermal processing system that provide instantaneous energy, typically requiring a very short and well controlled start up period. The flow of energy from lamps 24 can also be abruptly stopped at any time. As shown in the figure, lamps 24 are equipped with a gradual power controller 25 that can be used to increase or decrease the thermal energy being emitted by the lamps.

Also contained within chamber 12 is a plurality of radiation sensing devices generally 27. Radiation sensing devices 27 include optical fibers or light pipes 28 which are, in turn, in communication with a plurality of corresponding light detectors 30. Optical fibers 28 are configured to receive thermal energy being emitted by a wafer present in the chamber at a particular wavelength. The amount of sensed radiation is then communicated to light detectors 30 which generate a usable voltage signal for determining the temperature of the wafer. In one embodiment, each optical fiber 28 in combination with a light detector 30 comprises a pyrometer.

During the process of the present invention, system 10 should be designed such that optical fibers 28 only detect thermal radiation being emitted by wafer 14 and not detect radiation being emitted by lamps 24. In this regard, system 10, in one embodiment, includes a filter or window 32 which prevents thermal radiation being emitted by lamps 24 at the wavelength at which light detectors 30 operate from entering chamber 12. Filter 32 as shown in FIG. 1 can be a window positioned between chamber 12 and heat source 22. In an alternative embodiment, each lamp 24 can be covered by a separate filter. In the embodiment illustrated, window 32 also serves to isolate lamps 24 from the wafers and prevent contamination of the chamber.

As shown in FIG. 1, in the embodiment illustrated, thermal processing chamber 12 includes a reflective plate 26 which is connected to the plurality of optical fibers or light pipes 28. In general, when present in the system, reflective plate 26 is designed to reflect thermal radiation being emitted by a semiconductor wafer while the wafer is being heated. Specifically, reflective plate 26 should be designed to reflect thermal radiation at the wavelength at which light detectors 38 operate. Reflective plate 26 causes the radiation being emitted by the wafer to reflect multiple times between a surface of the wafer and a surface of reflective plate 26. As a result, optical fibers 28 sense more thermal radiation than that which is actually being emitted by the wafer.

By reflecting the radiation being emitted by the wafer multiple times, the reflective plate causes the radiation between the two surfaces to add up and approximate the radiation of a perfect black body at the temperature of the wafer. This has the effect of enhancing the emissivity of the wafer, which is typically unknown and hard to approximate, to a value close to unity, allowing for more accurate temperature measurements. The use of a reflective plate is more particularly described in U.S. Pat. No. 5,874,711 which is incorporated herein by reference.

Figure 2:
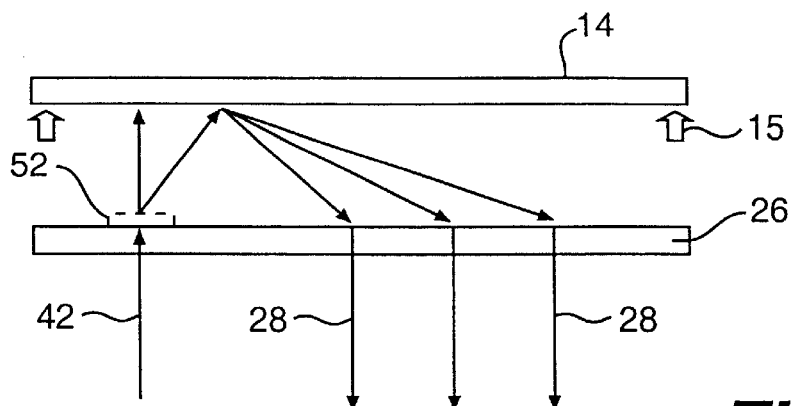
FIG. 2 is a side view of one embodiment of a calibrating light source and reflective device for use in the process of the present invention.

Referring to FIGS. 1 and 2, in accordance with the present invention, system 10 further includes a reflective device 14 and a calibrating light source 42 in order to calibrate radiation sensing devices 27. As shown in this embodiment, reflective device 14 is positioned on substrate holder 15 and can be removed and inserted into chamber 12 when it is desired to calibrate the radiation sensing devices. Calibrating light source 42, on the other hand, is affixed within thermal processing chamber 12. It should be understood, however, that calibrating light source 22 can also be placed outside of the chamber as long as the light source can be positioned in order to emit light into the chamber.

When it is desirable to calibrate radiation sensing devices 27, calibrating light source 42 emits a predetermined amount of light energy onto reflecting device 14. Reflecting device 14 is configured to scatter and reflect the light energy in a manner such that each of the radiation sensing devices is exposed to the same intensity of light. The amount of light energy being reflected off reflecting device 14 in accordance with the present invention is previously calculated and has a preset value.

Radiation sensing devices 27 are used to sense the amount of reflected light energy. The amount of light energy registered by the radiation sensing devices is then compared to the preset value. Should any differences be present between the measured value and the preset value, then the radiation sensing devices are calibrated accordingly.

Reflective device 14 used in the process of the present invention can have various shapes and can be made from various materials. In general, reflective device 14 should have a reflective surface having a substantially constant reflectivity at the wavelength at which the radiation sensing devices operate. The reflectivity of reflective device 14 can be any value as long as that value can be easily determined. Preferably, however, the reflective device is highly reflective at the wavelength of interest. For instance, in one embodiment, the reflectivity of the reflective device is at least 0.9 at the wavelength at which the radiation sensing devices operate.

In order to construct a reflective device having desired reflectivity characteristics, reflective device 14 can be made from various materials. For instance, in one embodiment, reflective device 14 can include a substrate having a highly reflective coating. The highly reflective coating can be made from, for example, a dielectric film. The dielectric film can be a multi-layer optical film specially designed to have the appropriate reflectivity at the desired wavelength. Such films are known in the art and can be obtained from Deposition Sciences, Inc. of Santa Rosa, Calif.

Besides dielectric films, the reflective device can also be made from highly polished metals coated with a clear protective coating, such as a clear dielectric coating. Such metals include gold, silver, and nickel. However, for a particular desired wavelength, metal surfaces are typically not as reflective as the dielectric films described above.

The substrate, on the other hand, can be made from various materials including quartz, silicon carbide, or stainless steel. Further, in an alternative embodiment, reflective device 14 can be made entirely from the above described dielectric film.

As described above and as shown particularly in FIG. 2, the system of the present invention should be configured so that light being emitted from calibrating light source 42 is reflected and/or scattered so that each radiation sensing device 28 is exposed to the same intensity of light. This objective can be accomplished according to various methods. For instance, in one embodiment, reflective device 14 can be designed to scatter the light being emitted by calibrating light source 42 across its surface opposite the radiation sensing devices. In this embodiment, in order to scatter the light, reflective device 14 can have a particular shape or can have a particular surface construction. For example, the surface of reflective device 14 can be rough so that the surface is substantially diffuse with respect to light being emitted by calibrating light source 42.

In an alternative embodiment, instead of or in addition to designing reflective device 14 to be substantially diffuse, the system can include a diffuser 52 as shown in phantom in FIG. 2. Diffuser 52 is placed in communication with calibrating light source 42 and is configured to scatter the light being emitted by the light source and form a uniformly and diffusely irradiated region on the surface of reflective device 14, especially in the regions opposite radiation sensing devices 28. Diffuser 52 ideally forms a uniform isotropic illumination.

An ideal theoretical diffuser produces a uniform source of diffused light that is traversing in totally random directions with high efficiency and perfect transparency. In the practical embodiment of the present invention, however, diffuser 52 need only approximate these ideal conditions. Thus, the diffuser can be limited in lateral extent instead of being infinite and can be substantially diffuse instead of perfectly diffuse.

Diffuser 52 as shown in FIG. 2 can assume various constructions. Preferably, diffuser 52 is planar, is substantially transparent to the light being emitted by calibrating light source 42, and scatters the light in random directions. In one embodiment, diffuser 52 can be a thin sheet of a transparent refractive material such as quartz, glass or sapphire, wherein at least one surface of the sheet has been roughened. In an alternative embodiment, diffuser 52 can be a layer of material made from small transparent and discrete particles which scatter light at the wavelength at which the radiation sensing devices operate. The small discrete particles can be made, for instance, from quartz, glass, sapphire, or noncrystalline aluminum oxide.

In a further alternative embodiment, diffuser 52 can be a sheet of transparent material containing many small microscopic bubbles which serve to scatter the light. Again, in this embodiment, the diffuser can be made from quartz, glass or sapphire.

In still another embodiment of the present invention, diffuser 52 can be one or more mirrors or other similar devices that divide light being emitted by calibrating light source 42 and focus the divided light at each location opposite each of the radiation sensing devices 28.

Calibrating light source 42 emits a predetermined amount of light energy when calibrating radiation sensing devices 28 according to the present invention. As shown in FIG. 1, calibrating light source 42 can be in communication with a light channel 44 that directs the light energy onto a particular location of reflecting device 14. Alternatively, however, calibrating light source 42 can be positioned closer to reflective device 14 without the use of light channel 44.

Light source 42 used in the system of the present invention can generally be any device that is capable of emitting a determinable amount of light energy. For instance, light source 42 can be an incandescent light bulb, a solid state device such as a laser diode, a light emitting diode, a gas laser, a non-coherent gas source such as an arc lamp, besides various other devices.

In order to calibrate radiation sensing devices 28 in accordance with the present invention, calibrating light source 42 emits light energy which is reflected by reflective device 14. The amount of light energy that is reflected by reflective device 14 at the wavelength at which the radiation sensing devices operate has a preset value. Radiation sensing devices 28 are then used to measure the amount of light energy being reflected off reflecting device 14. The measured value is compared to the preset value and, if necessary, the radiation sensing devices are adjusted or calibrated accordingly.

The preset value for the light energy being reflected off reflecting device 14 can be determined quantitatively, meaning directly determined, or qualitatively, meaning determined according to some relative standard. The preset value can be directly determined by knowing the amount of light energy being emitted by calibrating light source 42 and by knowing the percentage of the light energy that is reflected off reflecting device 14, such as by knowing the reflectivity of the reflective device. With knowledge of these variables, the amount of light energy that should be recorded by radiation sensing devices 28 can be easily calculated and compared to the measured value.

In an alternative embodiment, however, the actual amount of light energy that is being reflected off reflective device 14 remains unknown but is used to determine a relative standard by which the radiation sensing devices can be calibrated. For example, in this embodiment, radiation sensing devices 28 can be initially used to measure the amount of light energy being reflected off reflective device 14. This measured value then becomes a reference point for conducting processes within the chamber. At periodic intervals, reflective device 14 can be placed in the chamber and radiation sensing devices 28 can be used to measure the amount of light energy being reflected off the reflective device based on light being emitted by calibrating light source 42. This measured value can then be compared to the reference value that was measured previously. If necessary, adjustments can be made to the radiation sensing devices so that the sensing devices once again sense the referenced value, which eliminates inconsistencies when further processes are conducted in the chamber.

In accordance with the present invention, when calibrating the radiation sensing devices found within the chamber, preferably the calibration is carried out as close as possible to actual process conditions. In this manner, radiation sensing devices 28 produce accurate and reliable measurements which allow process conditions to be precisely controlled in the chamber.

Referring to FIG. 1, system 10 further includes a system controller 50 which can be, for instance, a microprocessor. Controller 50 receives voltage signals from light detectors 30 that represent the radiation amounts being sampled at the various locations. Based on the signals received, controller 50 is configured to calculate the temperature of wafers contained in the chamber.

System controller 50 as shown in FIG. 1 can also be in communication with lamp power controller 25. In this arrangement, controller 50 can calculate the temperature of a wafer, and, based on the calculated information, control the amount of thermal energy being emitted by lamps 24. In this manner, instantaneous adjustments can be made regarding the conditions within reactor 12 for processing the wafer within carefully controlled limits.

In one embodiment, controller 50 can also be used to automatically control other elements within the system. For instance, controller 50 can be used to control the flow rate of gases entering chamber 12 through gas inlet 18. As shown, controller 50 can further be used to control the rate at which wafer 14 is rotated within the chamber.

In accordance with the present invention, system controller 50 can also be used to automatically calibrate radiation sensing devices 27. In particular, the preset value can be stored within controller 50. The controller can then be configured to compare the preset value to the measured value and make adjustments as necessary.

Further, in one embodiment, controller 50 can also be in communication with calibrating light source 42. In this manner, controller 50 can be used to control when calibrating light source 42 emits light and the amount of light that is emitted. For example, in one embodiment, a radiation sensing device can be included in the system for monitoring the amount of light energy that is emitted by calibrating light source 42. This information can be provided to system controller 50. System controller 50 can then adjust the amount of power that is fed to calibrating light source 42 in order to ensure that the amount of light energy being emitted by the calibrating light source remains constant.

Figure 3:
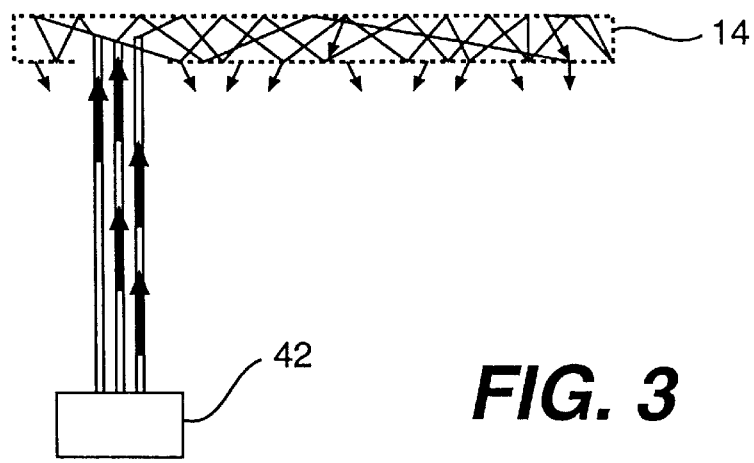
FIG. 3 is a side view of an alternative embodiment of a calibrating light source and reflective device that may be used in the process of the present invention.
Figure 4:
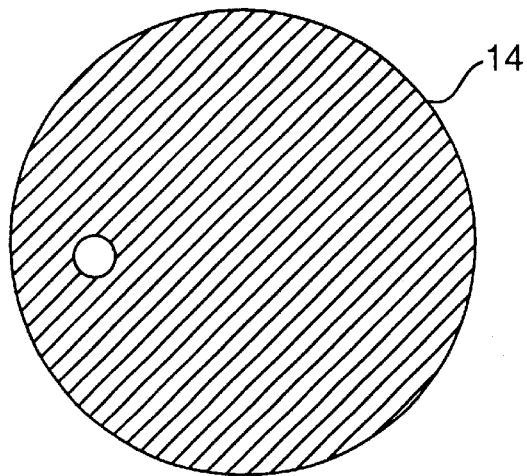
FIG. 4 is a plan view of the reflective device illustrated in FIG. 3.

Referring now to FIGS. 3 and 4, another alternative embodiment of a calibrating light source 42 and a reflecting device 14 in accordance with the present invention is illustrated. As described above, reflective device 14 should reflect light energy being emitted by calibrating light source 42 in a manner so that the radiation sensing devices are each exposed to the same amount of light at the operating wavelength. In the embodiment illustrated in FIGS. 3 and 4, light being emitted by calibrating light source 42 is directed into the interior of reflective device 14. Reflective device 14 is configured to disperse the light prior to exiting the device. Specifically, reflective device 14 is configured to disperse and scatter the light so that light energy exiting reflective device 14 is constant over the surface exposed to the radiation sensing devices.

In this embodiment, reflective device 14 can be constructed out of a thin semitransparent plate, such as a plate made from quartz or sapphire. The surfaces of the plate can be rough or prismatic in order to distribute the light energy entering the plate. In order for the light energy to be directed into the plate, the plate can include a small portion just opposite the light source which is polished and allows penetration of the light energy into the plate. Alternatively, reflective device 14 can include a small opening aligned with calibrating light source 42.

In this embodiment, calibrating light source 42 can be located in any position that will facilitate directing the light energy being emitted by the light source into the reflective device. For example, besides the configuration illustrated in FIG. 3, calibrating light source 42 can also be placed along the side of reflective device 14 or at the top of reflective device 14.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for calibrating a temperature sensing device in a thermal processing chamber comprising the steps of:
    providing a thermal processing chamber, said thermal processing chamber containing radiation sensing devices for monitoring the temperature of a semiconductor wafer placed in said chamber, said thermal processing chamber being in communication with a plurality of light energy sources for heating semiconductor wafers contained in said chamber, said chamber further including a calibrating light source;
    placing a reflective device within said thermal processing chamber, said reflective device being positioned opposite said radiation sensing devices;
    emitting light energy from said calibrating light source onto said reflective device, said reflective device reflecting an amount of light energy having a preset value onto said radiation sensing devices;
    sensing said amount of light energy being reflected from said reflective device by said radiation sensing devices; and
    calibrating said radiation sensing devices based upon the amount of light energy sensed by said radiation sensing devices in relation to said preset value.

2. A method as defined in claim 1, wherein said at least one radiation sensing device comprises a pyrometer.

3. A method as defined in claim 1, wherein said radiation sensing device senses said light energy at a preset wavelength.

4. A method as defined in claim 3, wherein said reflective device comprises a substrate having a reflective surface, said reflective surface having a reflectivity of at least 0.9 at said preset wavelength.

5. A method as defined in claim 1, wherein said reflective device comprises a substrate having a reflective surface, said reflective surface being made from a material comprising a dielectric composition.

6. A method as defined in claim 1, wherein said reflective device comprises a substrate having a reflective surface, said reflective surface being substantially diffuse.

7. A method as defined in claim 1, wherein said reflective device comprises a substrate having a reflective surface, said reflective surface being made from a material comprising a metal.

8. A method as defined in claim 1, wherein said light energy emitted by said calibrating light source is directed into said reflective device, said reflective device dispersing said light energy throughout said device before said light energy exits and is sensed by said at least one radiation sensing device.

9. A method as defined in claim 8, wherein said reflective device comprises a quartz plate having a rough surface, said rough surface being positioned opposite to said at least one radiation sensing device.

10. A method for calibrating temperature sensing devices in a thermal processing chamber comprising the steps of:
    providing a thermal processing chamber, said thermal processing chamber containing a plurality of pyrometers for monitoring the temperature of a semiconductor wafer placed in said chamber, said chamber further including a calibrating light source;
    placing a reflective device within said thermal processing chamber, said reflective device being positioned opposite said plurality of pyrometers;
    emitting light energy from said calibrating light source onto said reflective device, said reflective device being configured to scatter said light energy onto said pyrometers so that each of said pyrometers is exposed to substantially the same intensity of light, said intensity of light having a preset value;
    sensing said light energy being reflected from said reflective device by said plurality of pyrometers at a predetermined wavelength; and
    calibrating said pyrometers based upon the amount of light energy sensed by said pyrometers in relation to said preset value.

11. A method as defined in claim 10, wherein said predetermined wavelength is from about 0.9 microns to about 5 microns.

12. A method as defined in claim 10, wherein said calibrating light source emits infrared light.

13. A method as defined in claim 10, wherein said reflective device comprises a substrate having a reflective surface, said reflective surface being rough in order to scatter said light energy being emitted by said calibrating light source.

14. A method as defined in claim 10, wherein said reflective device comprises a substrate having a reflective surface, said reflective surface having a reflectivity of at least about 0.9 at said predetermined wavelength.

15. A method as defined in claim 10, wherein said reflective device comprises a substrate having a reflective surface, said reflective surface being made from a material comprising a dielectric composition.

16. A method as defined in claim 15, wherein said reflective device has the shape of a semiconductor wafer.

17. A method as defined in claim 15, wherein said substrate is made from a material selected from the group consisting of quartz and silicon carbide and wherein said reflective surface comprises a coating applied to said substrate made from a dielectric composition.

18. A method as defined in claim 10, wherein said light energy emitted by said calibrating light source is directed into said reflective device, said reflective device dispersing said light energy throughout said device before said light energy exits and is sensed by at least one radiation sensing device.

19. A method as defined in claim 18, wherein said reflective device comprises a quartz plate having a rough surface, said rough surface being positioned opposite to said at least one radiation sensing device.

* * * * *